United States Patent
Chadha (10) Patent No.: US 9,641,420 B1
(45) Date of Patent: *May 2, 2017

(54) METHODS AND APPARATUS FOR ASSESSING THE QUALITY OF A DATA PATH INCLUDING BOTH LAYER-2 AND LAYER-3 DEVICES

(71) Applicant: Juniper Networks, Inc., Sunnyvale, CA (US)

(72) Inventor: Ankit Chadha, Bangalore (IN)

(73) Assignee: Juniper Networks, Inc., Sunnyvale, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 14/839,136

(22) Filed: Aug. 28, 2015

Related U.S. Application Data (63) Continuation of application No. 13/722,064, filed on Dec. 20, 2012, now Pat. No. 9,124,529.

(51) Int. Cl.
*H04L 12/26* (2006.01)
*H04L 12/751* (2013.01)
*H04L 12/24* (2006.01)
*H04W 24/08* (2009.01)
*H04W 84/10* (2009.01)

(52) U.S. Cl.
CPC ............ *H04L 43/50* (2013.01); *H04L 41/12* (2013.01); *H04L 43/10* (2013.01); *H04L 45/02* (2013.01); *H04W 24/08* (2013.01); *H04W 84/10* (2013.01)

(58) Field of Classification Search
CPC . H04L 12/4641; H04L 12/4633; H04L 41/12; H04L 45/02; H04L 43/10
See application file for complete search history.

(56) References Cited

U.S. PATENT DOCUMENTS 8,767,587 B1\* 7/2014 Finn .................... H04L 12/2416
370/255
9,124,529 B1\* 9/2015 Chadha .................. H04L 43/50
(Continued)

OTHER PUBLICATIONS

Fabio Semperboni, "How to trace MAC address," CiscoZine.com, Daily reporting on Cisco Technology, retrieved from the Internet Jan. 12, 2011, http://www.ciscozine.com/2011/01/12/how-to-trace-mac-address/, 5 pgs.

(Continued)

*Primary Examiner* — Redentor Pasia
(74) *Attorney, Agent, or Firm* — Cooley LLP (57) ABSTRACT

In some embodiments, an apparatus includes a layer-2 device operably coupled to a source device and a destination device and disposed within a data path (1) between the source device and the destination device, and (2) includes at least one layer-3 device. The layer-2 device receives a first test data unit from the source device, and defines a quality datum associated with processing the first test data unit. The layer-2 device defines a second test data unit based on the first test data unit that includes the quality datum associated with processing the first test data unit. The layer-2 device sends the second test data unit to the layer-3 device. The layer-3 device defines a quality datum associated with processing the second test data unit at the layer-3 device and defines a third test data unit based on the second test data unit.

22 Claims, 6 Drawing Sheets

(56) References Cited

U.S. PATENT DOCUMENTS

| | | | |
|---|---|---|---|
| 2005/0036486 A1 | 2/2005 | Sahinoglu et al. | |
| 2009/0028155 A1* | 1/2009 | Chen | H04L 12/46 370/392 |
| 2009/0037607 A1* | 2/2009 | Farinacci | H04L 12/4641 709/249 |
| 2010/0002694 A1* | 1/2010 | Matsukawa | H04W 24/00 370/389 |

OTHER PUBLICATIONS

"Lab 1.6.4 Introduction to Fluke Network Inspector," Cisco Networking Academy Program, Copyright 2003, Cisco Systems, Inc., 13 pgs.

"Layer 2 Traceroute," TCP/IP Forum, retrieved from the Internet, http://www.tek-tips.com/viewthread.cfm?qid=170708, 3 pgs.

"3COM Network Supervisor Data Sheet," 3COM Corporation, Copyright 2004, 2 pgs.

"Understanding VLANS by Understanding MAC Table Operation," Copyright 2008 Cisco Systems, Inc., 4 pgs.

"Traceroute," Wikipedia, the free encyclopedia, last modified Aug. 1, 2012, retrieved from the Internet http://en.wikipedia.org/wiki/traceroute, 4 pgs.

Catalyst 6500 Release 12.2SX Software Configuration Guide—Layer 2 Traceroute Utility [Cisco Catalyst 6500 Series Switches]. Available as of Aug. 20, 2011. Retrieved from Internet, from http://www.cisco.com/c/en/us/td/docs/switches/lan/catalyst6500/ios/12-2SX/configuration/guide/book/12trace.html.

Geant QoS—Traceroute. Available as of Aug. 20, 2011. Retrieved from Internet, from http://www.gateway.nameflow.net/nep/geantqos/traceroute.html.

LiveAction QoS Monitor: Monitor QoS Policies in Real-Time. Aug. 5, 2012. http://actionpacked.com/products/qos-monitor.

Live Action QoS, "Interactive QoS configuration and monitoring", Keith Parsons, Video transcript and images, Feb. 9, 2012. https://www.youtube.com/watch?v=GwImJ4Riesw.

\* cited by examiner

Test Data Unit 400

| Dest. MAC 402 | Dest. IP 404 | Quality 406 | Local IP/ MAC 408 | Session ID 410 | Source IP/MAC 412 | Error ID 414 | Direction ID 416 |
|---|---|---|---|---|---|---|---|

Receive, at a layer-2 device and from a layer-3 device operably disposed between the layer-2 device and a source device, a first test data unit including a quality datum associated with processing the first test data unit at the layer-3 device.
502

Define a quality datum associated with processing the first test data unit at the layer-2 device.
504

Define a second test data unit based on the first test data unit and including the quality datum associated with processing the first test data unit at the layer-2 device.
506

Send the second test data unit to the layer-3 device such that the layer-3 device sends the second test data unit to the source device.
508

Receive a first test data unit from a source device and at a first layer-2 device associated with a first VLAN and disposed within a data path (1) between the source device associated with the first VLAN and a destination device associated with a second VLAN, and (2) including a second layer-2 device associated with the second VLAN.
702

↓

Define a quality datum associated with processing the first test packet at the first layer-2 device.
704

↓

Define a second test data unit based on the first test data unit and including the quality datum associated with processing the first test data unit at the first layer-2 device.
706

↓

Send the second test data unit such that (1) a third test data unit including the quality datum associated with processing the first test data unit at the first layer-2 device is received at the second layer-2 device, (2) the second layer-2 device defines a quality datum associated with processing the third test data unit at the second layer-2 device, and (3) the second layer-2 device defines a fourth test data unit based on the third test data unit and including the quality datum associated with processing the third test data unit at the second layer-2 device.
708

FIG. 7

METHODS AND APPARATUS FOR ASSESSING THE QUALITY OF A DATA PATH INCLUDING BOTH LAYER-2 AND LAYER-3 DEVICES

CROSS-REFERENCE TO RELATED APPLICATIONS

This application is a continuation of U.S. patent application Ser. No. 13/722,064, filed Dec. 20, 2012 and titled "Methods and Apparatus for Assessing the Quality of a Data Path Including Both Layer-2 and Layer-3 Devices," now U.S. Pat. No. 9,124,529, which is incorporated herein by reference in its entirety

BACKGROUND

Some embodiments described herein relate generally to methods and apparatus for assessing the quality of a data path between a source device and a destination device in an enterprise network that includes both layer-2 (L2) and layer-3 (L3) devices. More specifically, some embodiments described herein relate to methods and apparatus for detecting the data path taken by test data units while traversing between the source device and the destination device and determining the transit delays involved in each intermediate network node along the data path.

Typically, control units such as control packets and/or data units such as data packets sent from a source device to a destination device in an enterprise network can take multiple data paths. Each data path can involve multiple L2 intermediate devices and/or multiple L3 intermediate devices. Such intermediate devices can introduce delays caused by processing the control units and/or data units. Moreover, such delays are neither consistent nor predictable. Hence, such delays often lead to connectivity problems in an enterprise network and can reduce the efficiency of an enterprise network.

Known methods such as the L3 traceroute can be used for displaying the data path taken by control and/or data packets and measuring transit delays of packets associated with intermediate devices in the data path. L3 traceroute however, only displays the internet protocol (IP) address of each intermediate L3 device such as routers in the data path and a quality factor that is indicative of the transit delays associated with the packet in each intermediate L3 hop (i.e., no information on L2 devices can be provided). Other known methods such as a known L2 traceroute can return data path information if the source device and the destination device are in the same Virtual Local Area Network (VLAN) such as, for example, the MAC address of the intermediate L2 devices and their associated port identifiers. This known L2 traceroute utility fails if the source device and the destination device are located in different VLANs (i.e., no information on intermediate L3 devices can be provided). Additionally, this L2 traceroute utility also does not provide any quality factor that can be indicative of any transit delays.

Accordingly, a need exists for methods and apparatus for detecting the data path taken by control units and/or data units while traversing between a source device and a destination device in an enterprise network and determining the transit delays involved in each network node along the data path that can involve multiple intermediate L2 and/or L3 devices.

SUMMARY

In some embodiments, an apparatus comprises a layer-2 device that is operably coupled to a source device and a destination device and disposed within a data path (1) between the source device and the destination device, and (2) includes at least one layer-3 device. The layer-2 device receives a first test data unit from the source device, and defines a quality datum associated with processing the first test data unit. The layer-2 device defines a second test data unit based on the first test data unit that includes the quality datum associated with processing the first test data unit. The layer-2 device sends the second test data unit to the layer-3 device. The layer-3 device defines a quality datum associated with processing the second test data unit at the layer-3 device and defines a third test data unit based on the second test data unit that includes the quality datum associated with processing the second test data unit.

DETAILED DESCRIPTION

In some embodiments, an apparatus comprises a layer-2 device configured to be operably coupled to a source device and a destination device within a network. The layer-2 device is configured to be disposed within a data path (1) between the source device and the destination device, and (2) including at least one layer-3 device. The layer-2 device is configured to receive a first test data unit from the source device, and define a quality datum associated with processing the first test data unit at the layer-2 device. The layer-2 device is also configured to define a second test data unit based on the first test data unit and including the quality datum associated with processing the first test data unit at the layer-2 device. The layer-2 device is configured to send the second test data unit to at least one layer-3 device. The layer-3 device defines a quality datum associated with processing the second test data unit at the layer-3 device and defines a third test data unit based on the second test data unit and including the quality datum associated with processing the second test data unit at the layer-3 device.

In some embodiments, a non-transitory processor-readable medium includes code representing instructions to cause a processor to receive at a layer-2 device and from a layer-3 device operably disposed between the layer-2 device and a source device, a first test data unit including a quality datum associated with processing the first test data unit at the layer-3 device. The code can also cause the processor to define a quality datum associated with processing the first test data unit at the layer-2 device. The code can cause the processor to define a second test data unit based on the first test data unit and including the quality datum associated with processing the first test data unit at the layer-2 device. The code can further cause the processor to send the second test data unit to the layer-3 device such that the layer-3 device sends the second test data unit to the source device.

In some embodiments, an apparatus comprises a first layer-2 device configured to be associated with a first Virtual Local Area Network (VLAN). The first layer-2 device is configured to be disposed within a data path (1) between a source device associated with the first VLAN and a destination device associated with a second VLAN different from the first VLAN, and (2) including a second layer-2 device associated with the second VLAN. The first layer-2 device is configured to receive a first test data unit from the source device and is also configured to define a quality datum associated with processing the first test data unit at the first layer-2 device. The first layer-2 device is configured to define a second test data unit based on the first test data unit and including the quality datum associated with processing the first test data unit at the first layer-2 device. The first layer-2 device is configured to send the second test data unit such that (1) a third test data unit including the quality datum associated with processing the first test data unit at the first layer-2 device is received at the second layer-2 device, (2) the second layer-2 device defines a quality datum associated with processing the third test data unit at the second layer-2 device, and (3) the second layer-2 device defines a fourth test data unit based on the third test data unit and including the quality datum associated with processing the third test data unit at the second layer-2 device.

As used herein, the term "test data unit" can include a test data packet, a test data frame, a test data cell, or any other test data entity that can be transmitted between a source device and a destination device in an enterprise network.

As used herein, the term "physical hop" can include a physical link between two nodes, modules, and/or devices. For example, a data path operatively coupling a first device with a second device can be said to be a physical hop. Similarly stated, a physical hop can physically link the first device with the second device.

As used herein, the term "single physical hop" can include a direct physical connection between two nodes, modules and/or devices in a system. Similarly stated, a single physical hop can include a link via which two devices are coupled without intermediate devices. Accordingly, for example, if a first device is coupled to a second device via a single physical hop, the first device can send data packets directly to the second device without sending the data packets through intervening nodes, modules and/or devices.

As used herein, the term "single logical hop" means a physical hop and/or group of physical hops that are a single hop within a network topology associated with a first protocol (e.g., a first data link layer protocol). Similarly stated, according to the topology associated with the first protocol, no intervening nodes exist between a first node, module and/or device operatively coupled to a second module, node, and/or device via the physical hop and/or the group of physical hops. A first module, node and/or device connected to a second module, node and/or device via a single logical hop can send a data packet (or data frame) to the second module, node, and/or device using a destination address associated with the first protocol and the second module, node and/or device, regardless of the number of physical hops between the first device and the second device. In some embodiments, for example, a second protocol (e.g., a network layer protocol) can use the destination address of the first protocol (e.g., a data link layer protocol) to route a data packet (or data frame) from the first module, node, and/or device to the second module, node, and/or device over the single logical hop. Similarly stated, when a first module, node and/or device sends data to a second module, node, and/or device via a single logical hop of a first protocol, the first module, node, and/or device treats the single logical hop as if it is sending the data directly to the second module, node, and/or device.

As used in this specification, the singular forms "a," "an" and "the" include plural referents unless the context clearly dictates otherwise. Thus, for example, the term "a layer-2 (L2) device" is intended to mean a single layer-2 (L2) device or a combination of layer-2 (L2) devices.

Figure 1:
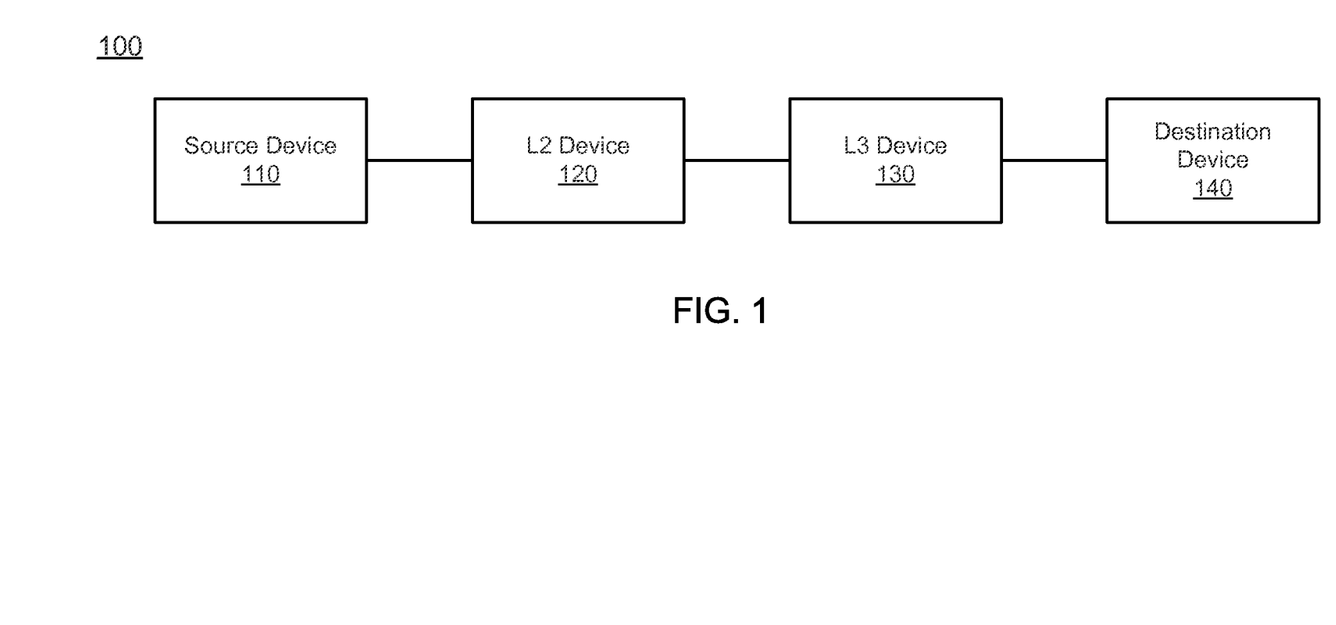
FIG. 1 is a schematic illustration of a system for assessing the quality of the data path between a source device and a destination device within an enterprise network that includes both intervening layer-2 and layer-3 devices, according to an embodiment.

FIG. 1 is a schematic illustration of a system for assessing the quality of the data path between a source device and a destination device within an enterprise network that includes both intervening layer-2 and layer-3 devices, according to an embodiment. The portion of an enterprise system 100 includes a source device 110, a layer-2 (L2) device 120, a layer-3 (L3) device 130, and a destination device 140.

The source device 110 and the destination device 140 can be, for example, a server or host machine such as for example, a web server, an application server, a proxy server, a telnet server, a file transfer protocol (FTP) server, or a personal computing device such as a desktop computer, a laptop computer, a personal digital assistant (PDA), a standard mobile telephone, a tablet personal computer (PC), and/or so forth. In some embodiments, the source device 110 and/or the destination device 140 can be an L2 device and/or an L3 device. Thus, as described in further detail herein, the data path can begin and/or end at, for example, an L2 switch or an L3 router.

The L2 device 120 can be, for example, any device that can receive, process, check for errors, and forward (or send) data units at the data link layer (layer-2) of the Open Systems Interconnection (OSI) model. The L2 device 120 can be, for example, a hub, an Ethernet switch, a network bridge, and/or the like. The L3 device 130 can be, for example, any device that can provide routing and forwarding services, and define logical paths, such as virtual circuits, for transmitting data units from one node (or device) in one VLAN to another node (or device) in another VLAN. The L3 device 130 can perform addressing, internetworking, error handling, congestion control and packet sequencing on data units in addition to routing and forwarding. The L3 device 130 can be, for example, a layer-3 capable switch, a router, and/or the like.

In FIG. 1, the L2 device 120 is configured to be disposed within a data path between the source device 110 and the destination device 140. The data path also includes the L3 device 130 disposed between the L2 device 120 and the destination device 140. The L2 device 120 is configured to receive a first test data unit from the source device 110, and define a quality datum associated with processing the first test data unit (also referred to as the first quality datum) at the L2 device 120. The first test data unit can be, for example, a Protocol Data Unit (PDU) specified in a protocol of a given layer (such as layer-2 and/or layer-3) that can include protocol-control information and possibly user data for the layer. The first test data unit can include, for example, the source device Media Access Control (MAC) address, the source device Internet Protocol (IP) address, the destination device MAC address, the destination device IP address, an error ID portion, a quality datum portion, and/or the like. The first quality datum can include, for example, a quality of service (QoS) measurement such as a Differentiated Services Code Point (DSCP) value, a Class of Service (CoS) value, and/or the like. In other embodiments, the first quality datum can include, for example, a timestamp value or a delay value that is returned for each intermediate device (e.g., a router, a switch, etc.) along the data path (between the source device and the destination device). The timestamp value or the delay value denotes the amount of time (latency) used for the intermediate device to process the test data unit (or the time period associated with the test data unit traversing the intermediate device). Typically, the delay associated with the data unit traversing the intervening devices is measured in the millisecond range. In some instances, however, the delay can also be measured for longer (seconds) and/or shorter (sub-millisecond) timeframes. The first quality datum can also include a device identifier for each intermediate device through which the first test data unit traverses. This can allow the source device to associate the different timestamp or delay values with the different intermediate devices. Thus, the first quality datum portion of the first test data unit can be used to discover the specific routes (or the specific data path) that data units take when being sent from a source device to the destination device in addition to the delays that may occur in each intermediate device along the route (or data path).

The L2 device 120 is also configured to define a second test data unit based on the first test data unit and including the first quality datum. The L2 device 120 is configured to send the second test data unit to the L3 device 130 based on the address of the destination device 140 contained in the first test data unit. In this case, the second test data unit sent to the L3 device 130 is a first instance or copy of the second test data unit. The L2 device 120 is also configured to send a second instance or copy of the second test data unit to the source device 110 based on the address of the source device 110 contained in the first test data unit. The second test data unit can include the different portions (or parts) as described above regarding the first test data unit. In addition, the second test data unit can also include an identifier associated with a port at the L2 device 120 via which the L2 device 120 received the first test data unit, and a device identifier associated with the L2 device 120 such as for example, a MAC address, an IP address, and/or the like.

The L3 device 130 is configured to define a quality datum associated with processing the second test data unit at the L3 device 130 (also referred to as the second quality datum), and also defines a third test data unit based on the second test data unit and including the second quality datum. The L3 device 130 is configured to send the third test data unit to the destination device 140 based on the address of the destination device 140 contained in the second test data unit. In this case, the third test data unit sent to the destination device 140 is a first instance or copy of the third test data unit. The L3 device 130 is also configured to send a second instance or copy of the third test data unit to the source device 110 (via the L2 device 120) based on the address of the source device 110 contained in the second test data unit. The third test data unit can include the different portions (or parts) as described above regarding the first and second test data units. In some instances, the third test data unit can also include an identifier associated with a port at the L3 device 130 via which the L3 device 130 received the second test data unit, and a device identifier associated with the L3 device 130 such as for example, an IP address, and/or the like.

The destination device 140 is configured to define a quality datum associated with processing the third test data unit at the destination device 140 (also referred to as the third quality datum) and also defines a fourth test data unit based on the third test data unit and including the third quality datum. The destination device 140 is configured to send the fourth test data unit to the source device 110 (via the L3 device 130 and L2 device 120) based on the source device 110 address included in the third test data unit. The fourth test data unit can include the different portions (or parts) as described above regarding the first, second, and third test data units. In addition, the fourth test data unit can also include an identifier associated with a port at the destination device 140 via which the destination device 140 received the third test data unit, and a device identifier associated with the destination device 140 such as for example, a MAC address, an IP address, and/or the like.

Figure 2:
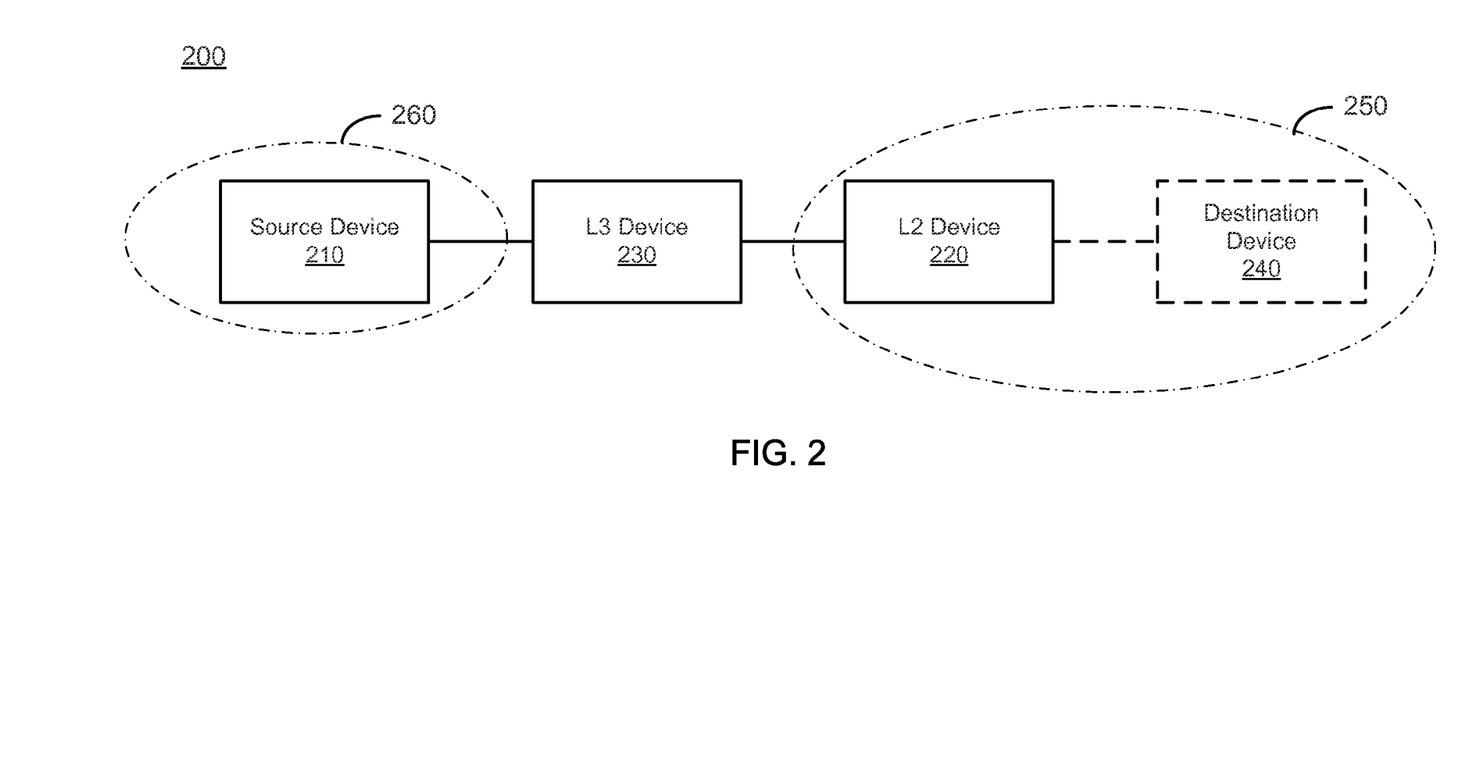
FIG. 2 is a schematic illustration of a system for assessing the quality of the data path between a source device and a destination device within an enterprise network that includes a layer-3 device operably disposed between the source device and a layer-2 device, according to an embodiment.

In other embodiments, the portion of the enterprise network 200 can include an L3 device 230 operably disposed between the source device 210 and an L2 device 220 as shown in FIG. 2. In such embodiments, the L3 device 230 is operably disposed between the L2 device 220 associated with a first Virtual Local Area Network (VLAN) 250 and the source device 210 associated with a second VLAN 260.

In such embodiments, the L2 device 220 can be configured to receive from the L3 device 230 a first test data unit including a first quality datum associated with processing the first test data unit at the L3 device 230. The first quality datum is an indication of the amount of time for the L3 device 230 to process the first test data unit. The L2 device 220 is configured to define a quality datum associated with processing the first test data unit at the L2 device 220 (also referred to as the second quality datum) that is an indication of the amount of time for the L2 device 220 to process the first test data unit. The L2 device 220 is also configured to define a first instance of a second test data unit based on the first test data unit and including the second quality datum associated with processing the first test data unit at the L2 device 220. The L2 device 220 can be configured to send the first instance of the second test data unit to the L3 device 230 such that the L3 device 230 sends the first instance of the second test data unit to the source device 210.

In some instances, the L2 device 220 can also be configured to define the second test data unit to include the first quality datum in addition to including the second quality datum. The first quality datum is an indication of the amount of time for the L3 device 230 to process the first test data unit. In such instances, each of the first quality datum or the second quality datum (or a quality datum for any other intermediate device) can include a device identifier such that the source device 210 can associate the individual quality datum with latency information related to the proper network node (or device) such as, for example, an intermediate L2 device 220, an intermediate L3 device 230, a destination device, and/or the like.

In such embodiments, the second test data unit defined by the L2 device 220 includes an identifier associated with a port at the L2 device 220 via which the L2 device 220 receives the first test data unit and an identifier associated with the L2 device 220 such as, for example, a MAC address, and IP address, and/or the like. The L2 device 220 is also configured to define a second instance of the second test data unit based on the first test data unit and including the second quality datum. In some instances, the L2 device 220 can be configured to send the second instance of the second test data unit to the destination device 240 that can be located within the same VLAN 250, or via additional intermediate L2 devices based on the MAC address of the destination device 240. In other instances, the L2 device 220 can be configured to send the second instance of the second test data unit to additional intermediate L3 devices in route to the destination device 240, if the destination device is located on a third VLAN that is different from the first VLAN 250 and the second VLAN 260 based on the IP and MAC addresses of the destination device 240 respectively.

Figure 3:
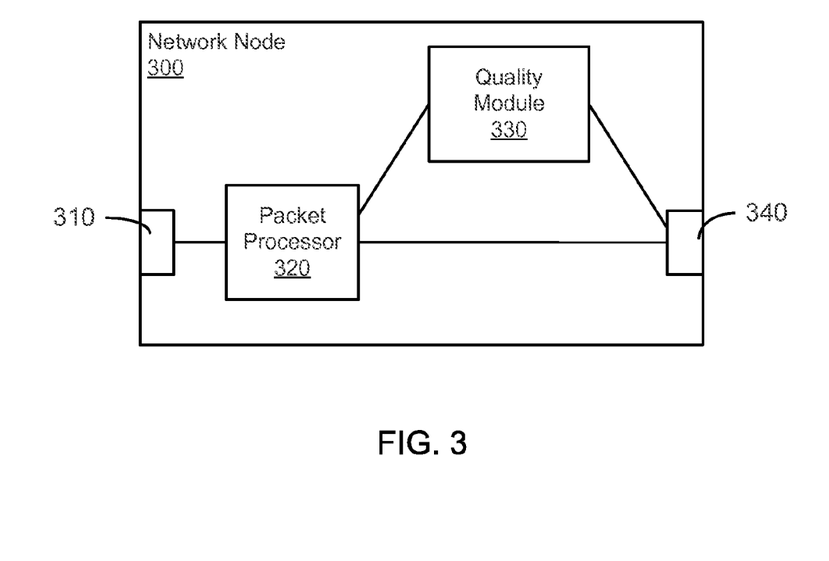
FIG. 3 is a system block diagram of a network node, according to an embodiment.

FIG. 3 is a system block diagram of a network node 300, according to an embodiment. The network node 300 can be any node in an enterprise network and can be or include an L2 device, an L3 device, a source device and/or a destination device. For example, network node 300 can be the source device 110, the L2 device 120, the L3 device 130, or the destination device 140 of FIG. 1. The network node 300 includes a port 310, a port 340, a packet processor 320 and a quality module 330. The ports 310 and/or 340 can serve as both egress and/or ingress ports depending on the direction of data unit transmission along the data path. In some instances, the ports 310 and/or 340 can be for example, wired Ethernet ports that allow wired Institute of Electrical and Electronics Engineers (IEEE) 802.3 data transmission. In such instances, the wired ports 310 and/or 340 can connect the network node 300 to a wired enterprise network such as network 100 in FIG. 1. Referring to FIGS. 1 and 3, the ports 310 and/or 340 can receive a test data unit from a source device, a destination device, or another intermediate network node such as an L2 device or an L3 device. The network node 300 can define a quality datum that is indicative of the amount of time used to process the test data unit. The network node 300 can also define a new test data unit that is based on the received test data unit and the quality of datum associated with processing that test data unit at the network node 300. The network node 200 can send the new test data unit to a source device, a destination device or another intermediate network node such as an L2 device or an L3 device via the port 310 or 340.

In other instances, the ports 310 and/or 340 can be wireless ports that allow and/or facilitate the transmission of data via IEEE 802.11 wireless technology such as, for example, Wireless Fidelity (WiFi). In such instances, the WiFi ports 310 and/or 340 can connect the network node 300 to the remaining portions of an enterprise network supporting wireless connectivity such as network 100 in FIG. 1. In yet other instances, the ports 310 and/or 340 can be cellular ports that allow and/or facilitate the transmission of data via cellular technologies such as, for example, third generation mobile telecommunications (3G), fourth generation mobile telecommunications (4G), Global System for Mobile Communication (GSM), and/or the like. In such instances, the cellular ports 310 and/or 340 can connect the network node 300 to the remaining portions of an enterprise network supporting cellular connectivity such as the portion of enterprise network 100 in FIG. 1.

The packet processor 320 can be a hardware module and/or software module stored in the memory of the network node 300 (not shown in FIG. 3) and/or executed in the processor of the network node 300 (not shown in FIG. 3) that causes the network node 300 to execute operations associated with processing data units and control units traversing through the network node 300. The packet processor 320 can process test data units arriving to the network node 300 and can define a quality datum that is an indication of the time used to process the test data unit (e.g. a DSCP value, a CoS value, a timestamp and/or other timing information). In some instances, the network node 300 forwarding, passing or sending the test data unit can be an intermediate network node 300 based on the destination address in the test data unit. In such instances, the test data unit can be L3 routed to the next physical hop associated with the destination device IP address of the test data unit. In such instances, the packet processor 320 can look up an entry in a lookup or a routing-table associated with and/or operably coupled to the network node 300 for a MAC address for the next physical hop device in the data path. In some instances, the MAC address can correspond to the MAC address of the destination device. In other instances, the MAC address can be the MAC address of another network node (e.g., an L2 device) in the data path.

In some instances, the lookup or routing table in the network node 300 may not have a MAC address entry associated with the destination device IP address. In such instances, the packet processor 320 can broadcast an Address Resolution Protocol (ARP) request signal to each network node in a VLAN that is associated with the destination device IP address and that requests a MAC address associated with a next hop device in route to the destination device IP address. Accordingly, the MAC address associated with the ARP request can be obtained by the network node 200. In the event that the ARP request sent out by the packet processor is not able to retrieve a MAC address, the packet processor 220 can send a signal to the quality module 230 to set the error ID portion bit and the direction ID portion bit of the test data unit to "1" (as discussed below and shown in FIG. 4; see error ID portion 414 and direction ID portion 416). The packet processor 320 can send the test data unit in the reverse direction back to the originator of the test data unit via the port 310 or 340 that received the test data unit. In some cases, the originator of the test data unit can be the source device. In other cases, the originator of the test data unit can be the network node in the previous hop along the data path.

The quality module 330 can be a hardware module and/or software module stored in the memory of the network node 300 (not shown in FIG. 3) and/or executed in the processor of the network node 300 (not shown in FIG. 3) that causes the network node 300 to execute specific operations that are associated with processing test data units passing through the network node 300. The quality module 330 can update a quality portion of the test data units (quality portion 406 discussed further below and shown in FIG. 4) arriving to the network node 300 based on the quality datum defined by the packet processor 320 that can include for example, a timestamp, a delay value, and/or a number indicating the delay in processing the test data unit in the network node 300. In some embodiments, the quality module 330 can update the quality portion of the test data units arriving to the network node 300 to include Class of Service (CoS) and/or Differentiated Services Code Point (DSCP) values that can provide a mechanism for classifying and managing network traffic. In some instances, when the network node 300 is a layer-2 device, the quality module 330 can update the test data unit to include an identifier associated with a port at the network node 300 (L2 device) via which the network node 300 received a test data unit, and an identifier associated with the network node 300. Additionally, the quality module can update the IP/MAC address portion of each test data unit traversing through the network node 300 (IP/MAC address portion 408 discussed further below and shown in FIG. 4).

If the network node 300 is an L3 capable device, both the IP and MAC address of the network node 300 will be updated in this portion. If the network node 300 is an L2 device, only the MAC address of the device will be updated in the IP/MAC portion of the test data unit. The quality module 330 can also assign a unique session ID portion to the test data units. The session ID portion of the test data units can help devices track test data units associated with individual sessions so that accurate tracking information (e.g., transit delays of test data units) can be gathered along the data path.

Figure 4:
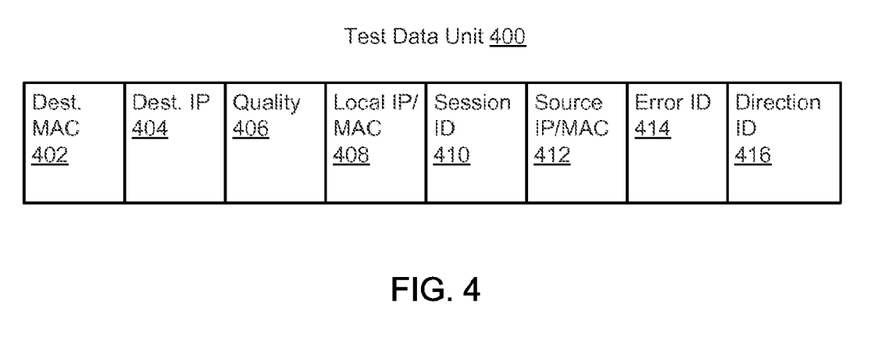
FIG. 4 is a block diagram representing a test data unit, according to an embodiment.

Referring to FIG. 4, a test data unit 400 includes a destination MAC address portion 402, a destination IP address portion 404, a quality portion 406, an own IP/MAC address portion 408, a session ID portion 410, a source IP/MAC address portion 412, an error ID portion 414, and a direction ID portion 416. Each of these portions is discussed further below.

The destination MAC address portion 402 identifies the MAC address of the destination device. For example, in some instances, the destination device is in the same VLAN as the source device. In such instances, the destination MAC address portion 402 of the test data unit includes the MAC address of the destination device. In other instances, the destination device is not in the same VLAN as the source device. In such instances, the test data unit is to be L3 routed from the VLAN of the source device to the VLAN of the destination device or the VLAN of the device in the next hop along the data path from the source device to the destination device. Hence, in such instances the destination MAC address portion 402 includes the MAC address of the L3 device (e.g., a router or an L3-switch) that will either route the test data unit to the VLAN of the next "physical" hop device in the data path or the VLAN of the destination device. The destination MAC address portion 402 indicates whether the test data unit to the actual destination IP address is to be L2 switched or L3 routed.

If the test data unit is to be L3 routed, the intermediate L3 device (or network node) can search for an entry in a lookup table or a routing-table associated with and/or operably coupled to the intermediate L3 device to determine the MAC address of the device in next hop in the data path (or the MAC address of the destination device). Alternatively, the intermediate L3 device can also send an ARP request to all devices (or network nodes) in the VLAN of the next hop device (or the VLAN of the destination device) to obtain the MAC address of the device in next hop in the data path (or the MAC address of the destination device). The intermediate L3 device can update the destination MAC address portion 402 of the test data unit with the new MAC address of the device in the next hop in the data path or the MAC address of the destination device, and send the test data unit to the appropriate device in the next hop (which can also be the destination device). If the MAC address of the device in the next hop (or the MAC address of the destination device) is not returned in response to the ARP request, the intermediate L3 device can set the error ID portion 414 bit to "1" and the direction ID portion 416 bit to "1" and send a copy of test data unit back to the source device.

In some instances, the test data unit is to be L2 switched and the MAC address of the destination device can be recognized by all the intermediate L2 devices in the VLAN. In such instances, the destination MAC address portion 402 of the test data unit can be used by all intermediate L2 devices to look up their respective MAC address tables to locate the port in communication to the destination device and send (pass or forward) the test data unit to the appropriate port to ultimately send (pass or forward) the test data unit to the destination device.

In other instances, the test data unit is to be L2 switched and the destination MAC address portion 402 of the test data unit is not recognized by one or multiple intermediate L2 devices in the VLAN. In such instances, the test data unit is temporarily stored in a buffer. The intermediate L2 device can generate a new test data unit with a different session ID portion 410 and/or generate a new MAC address query signal, and can flood the new test data unit and/or the new MAC address query signal to all the ports in the corresponding VLAN (i.e., flood to all the ports with the same VLAN ID as the port that received the test data unit). Once the destination device with the appropriate MAC address sends back a reply signal, the intermediate L2 device can use the properties (e.g., egressing CoS value) of the port in communication with the destination device reply signal to update its MAC address table to identify the port in communication to the destination device. The intermediate L2 device can then update the test data unit stored in the buffer and send (pass or forward) the test data unit (from the buffer) to the appropriate port to ultimately send (pass or forward) the test data unit to the destination device. In some other instances, the destination device may not send back a reply signal after repeated queries. In such instances, if no ports in the intermediate L2 device can be associated with the MAC address of the destination device after a pre-determined number of queries, the second L2 device can set the error ID portion 414 bit and the direction ID portion 416 bit of the test data unit to "1" and send the test data unit back to the source device.

The destination IP address portion 404 identifies the IP address of the destination device involved in the tracerouting data path. The destination MAC address portion 402 and/or the destination IP address portion 404 is populated by the user/source device. If the source device that originates the test data units is an L2 only device, then the source device will identify at least the destination MAC address portion 402 or both the destination MAC address portion 402 and the destination IP address portion 404 of the test data unit such that the source device (which is an L2 only device) has the address of the final destination device to which to send the test data units. If the source device that originates the test data units is an L3-capable device, then the source device will identify only the destination IP address portion 404 of the test data unit. The source device can search for an entry in a lookup or a routing-table associated with and/or operably coupled to the source device to determine the MAC address of the device in next hop in the data path. Alternatively, the source device (which is an L3 capable device) can also send an ARP request to all devices (or network nodes) in the VLAN of the next hop device (or the VLAN of the destination device) to obtain the MAC address of the device in next physical hop in the data path or the MAC address of the destination device.

The quality portion 406 of the test data unit is based on the quality datum defined by the packet processor 320 that can include for example, a timestamp, a delay value, and/or a number indicating the delay in processing the test data unit in each network node on every hop along the data path. In some embodiments, the quality portion 406 of the test data units can include a Class of Service (CoS) and/or Differentiated Services Code Point (DSCP) value that can provide a mechanism for classifying and managing network traffic. In some instances, when the network node that is transmitting the test data units is an L2 device, the quality portion 406 of the test data unit can include an identifier associated with a port at the network node 300 (L2 device) that received the test data unit, and an identifier associated with that network node 300. In some configurations, the quality portion 406 of the test data unit can contain a table that lists the delay in processing the test data unit in each (intermediate) network node as the test data unit traverses between the source device and the destination device.

The local IP/MAC address portion 408 of the test data unit is the IP and/or MAC address of each intermediate device or network node at every hop along the data path from the source device to the destination device. If the intermediate device is an L3 device, the intermediate device populates both the IP address and MAC address in the local IP/MAC address portion 408 of the test data unit. If the intermediate device is an L2 device, the IP address is left blank and the local IP/MAC address portion 408 is populated by the device's MAC address. In some configurations, the local IP/MAC portion 408 of the test data unit can contain a table or similar information that lists the IP and/or MAC address of each intermediate device or network node the test data unit traverses between the source and destination device. In such configurations, the copy of the test data unit that reaches the destination device or source device can have all the relevant information about the intermediate devices and the delay associated with those intermediate devices in the data path between the source device and the destination device.

The session ID portion 410 of the test data unit is a unique value assigned by the source device that is preserved at each hop in the data path between the source device and the destination device. The session ID portion 410 can be used by devices to track test data units associated with individual sessions so that accurate tracking information (e.g., transit delays of processing test data units) can be gathered along the data path. Multiple copies of the test data unit to be generated by the source device and sent to the destination device simultaneously can be tracked through the use of the session ID portion 410 that allows identification of a specific session.

The source IP/MAC address portion 412 of the test data unit includes the IP and/or MAC address of the source device. If the source device in an L2 device, the source IP/MAC address portion 412 contains the MAC address of the source device. If the source device in an L3 device, the source IP/MAC address portion 412 contains both the IP address and the MAC address of the source device. The source IP/MAC address portion 412 of the test data unit allows the source device to determine whether if the incoming test data units belong to a session started by the source device. This helps avoiding using any test data units that originate from other devices in determining route and tracking information (e.g., transit delays of test data units) in the data path between the source device and the destination device.

The error ID portion 414 of the test data unit highlights whether an error occurred in a test data unit reaching the destination device. The error ID portion 414 can include one bit that can be set to "1" by any intermediate device or network node if an error occurs in sending the test data unit to the device in the next hop in the data path. For example, the bit in the error ID portion 414 can be set to "1" if the MAC address of the destination device or the device in the next hop along the data path cannot be obtained from a routing table and/or an ARP request sent to all the network nodes (devices) in the destination device (or next hop device) VLAN. If no error occurs during transmission of the test data unit, the bit in the error ID portion is set to "0".

The direction IP portion 416 to the test data unit can include a bit that is set to "1" by the destination device and/or any intermediate device when that destination device and/or intermediate device sends the test data unit back to the source device. Note that certain portions of the test data unit such as, for example, the destination IP address portion 404, the session ID portion 410, and the source IP/MAC address portion 412 need not change at any hop along the data path.

Figure 5:
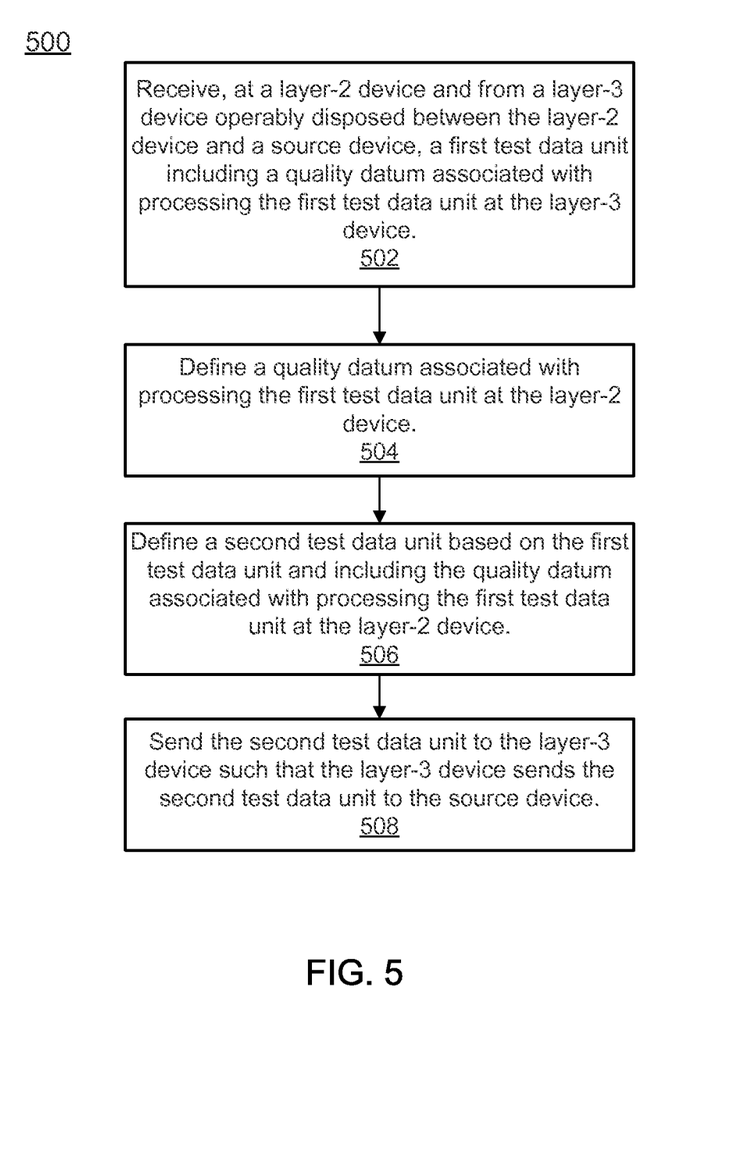
FIG. 5 is a flow chart illustrating a method for an L2 device to generate a quality datum associated with processing a test data unit received at the L2 device from an L3 device, according to an embodiment.

FIG. 5 is a flow chart illustrating a method for an L2 device to generate a quality datum associated with processing a test data unit received at the L2 device from an L3 device, according to an embodiment. The method 400 includes receiving at, for example, an L2 device and from an L3 device operably disposed between the L2 device and a source device, a first test data unit including a first quality datum, which is associated with processing the first test data unit at the L3 device, at 502. As described above, in such configurations, the L3 device can be operably disposed between the L2 device associated with a first VLAN and the source device associated with a second VLAN, where the second VLAN is different from the first VLAN. The first quality datum is an indication of the amount of time for the L3 device to process the first test data unit and is included in the quality portion of the first test data unit as, for example, a DSCP value, a CoS value, a timestamp, a delay value, and/or a number indicating the delay in processing the first test data unit in the L3 device.

At 504, a second quality datum, which is associated with processing the first test data unit at the L2 device, is defined by the L2 device. As described above, the second quality datum is an indication of the amount of time taken for the L2 device to process the first test data unit. At 506, a second test data unit is defined at the L2 device based on the first test data unit and including the second quality datum associated with processing the first test data unit at the L2 device. As described above, the second quality datum can be included in the quality portion of the second test data unit as, for example, a DSCP value, a CoS value, a timestamp, a delay value, and/or a number indicating the delay in processing the first test data unit in the L2 device. As described above, in some configurations, the second test data unit defined by the L2 device can include an identifier associated with the port at the L2 device via which the L2 device received the first test data unit (from the L3 device), and an identifier associated with the L2 device such as, for example, a MAC address, and/or the like.

At 508, the second test data unit is sent to the L3 device by, for example, the L2 device such that the L3 device sends the second test data unit to the source device. As described above, in some instances, the L2 device can also be configured to define the second test data unit to include the first quality datum associated with processing the first test data unit at the L3 device, in addition to including the second quality datum associated with processing the first test data unit at the L2 device. In such instances, each quality datum associated with processing the first test data unit in the L3 device and/or L2 device (or any other intermediate device) can include a device identifier such that the source device can associate the individual quality datum with latency information related to the proper network device such as, for example, an intermediate L2 device, an intermediate L3 device, a destination device, and/or the like.

Enterprise networks can often be large network systems that can include multiple VLANs and L3 routers spanned across a large geographic area. In such large networks, it commonplace to have the source device and the destination device in a data path located to separate VLAN's that are operably coupled by multiple intermediate VLANs and routers. Accordingly, a need exists for assessing the quality of the data path between a source device and a destination device located on separate VLAN's.

Figure 6:
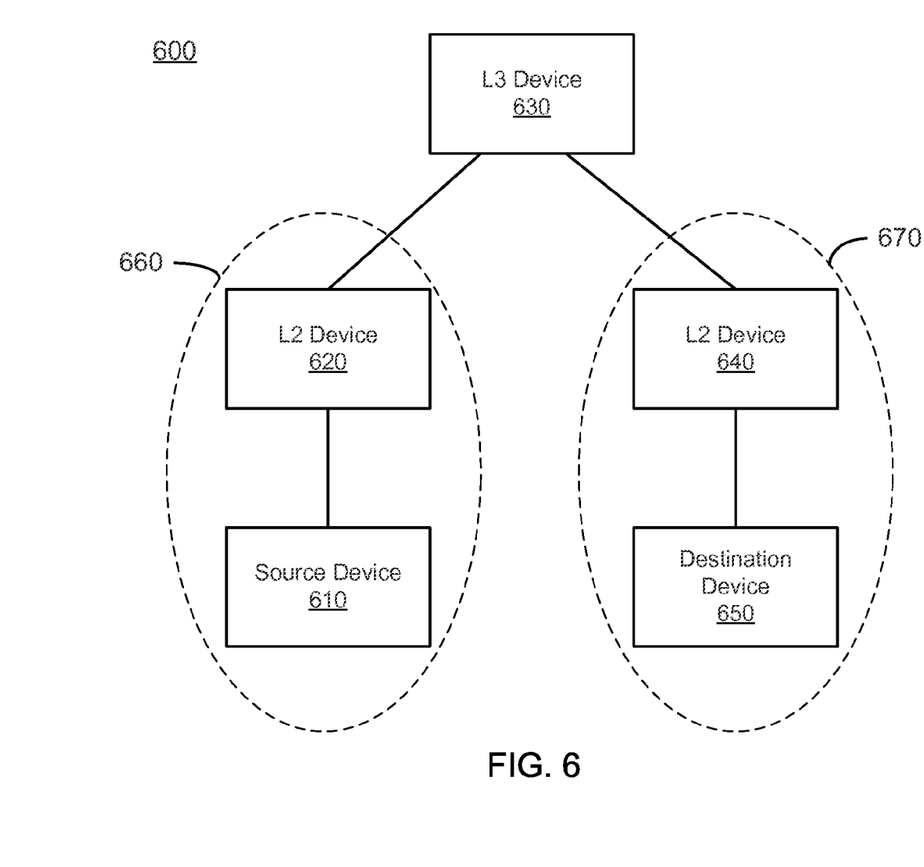
FIG. 6 is a schematic illustration of a system for assessing the quality of the data path between a source device and a destination device located on separate Virtual Local Area Networks (VLAN's), according to an embodiment.

FIG. 6 is a schematic illustration of a system for assessing the quality of the data path between a source device and a destination device located on separate Virtual Local Area Networks (VLAN's), according to an embodiment. The system 600 includes a source device 610 and a first L2 device 620 that are associated with a first VLAN 660, an L3 device 630, and a second L2 device 640 and a destination device 650 that are associated with a second VLAN 670.

The source device 610 and the destination device 650 can be a server or host machine such as for example, a web server, an application server, a proxy server, a telnet server, an FTP server, or a personal computing device such as a desktop computer, a laptop computer, a PDA, a standard mobile telephone, a tablet PC, and/or so forth. The L2 devices 620 and 640 can be any device that can receive, processes, check for errors, and forward (or send) data frames at the data link layer (L2) of the OSI model. The L2 device 620 and/or 640 can be, for example, a hub, an Ethernet switch, a network bridge, and/or the like. The L3 device 630 can be any device that can provide routing and forwarding services, and define logical paths, such as virtual circuits, for transmitting data packets from one node (or device) in one VLAN to another node (or device) in another VLAN. The L3 device 630 can perform addressing, internetworking, error handling, congestion control and packet sequencing on data packets in addition to routing and forwarding. The L3 device 630 can be, for example, an-L3 capable switch, a router, and/or the like.

In FIG. 6, the first L2 device 620 is associated with a first VLAN 660 and is disposed within a data path between a source device 510 associated with the first VLAN 660 and a destination device 650. The destination device 650 is, however, associated with a second VLAN 670 different from the first VLAN 660 such that the second VLAN 670 also includes a second L2 device 640. The first L2 device 620 can receive a first test data unit from the source device 610 via a port in communication with the source device 610. The first L2 device 620 can define a quality datum associated with the time used in processing the first test data unit at the first L2 device 620. The first L2 device 620 can also define a first instance and a second instance of a second test data unit based on the first test data unit that includes the quality datum associated with processing the first test data unit at the first L2 device 620. The first and second instance of the second test data unit can also include an identifier associated with a port of the first L2 device 620 via which the first L2 device 620 received the first test data unit, and an identifier associated with the first L2 device such as, for example, a MAC address, and/or the like. As discussed above, the port of the first L2 device 620 that receives the first test data unit can be, for example, an Ethernet port, a WiFi port, a cellular port, and/or the like.

The first L2 device 620 can send the second instance of the second test data unit to the source device 610 based on the address of the source device 610 within the first test data unit. The first L2 device 620 can also send the first instance of the second test data unit to the L3 device 630 based on the address of the destination device within the first test data unit. In such instances, a third test data unit including the quality datum associated with processing the first test data unit at the first L2 device 620 is received at the second L2 device 640 associated with the second VLAN 670. In such instances, the L3 device 630 defines the third test data unit based on the second test data unit, the quality datum associated with processing the first test data unit at the first L2 device 620, and the quality datum associated with processing the second test data unit at the L3 device 630. The second L2 device 640 associated with the second VLAN 670 defines a quality datum associated with processing the third test data unit at the second L2 device 640. The second L2 device 640 also defines a fourth test data unit based on the third test data unit and including the quality datum associated with processing the third test data unit at the second L2 device 640.

The first L2 device 620 receives from the second L2 device 640 a first instance of a fourth test data unit, where a first instance and a second instance of the fourth test data unit is defined by the second L2 device 640 and are based on the third test data unit and the quality datum associated with processing the third test data unit at the second L2 device 640. The first L2 device 620 sends the first instance of the fourth test data unit to the source device 610 via a port in communication with the source device 610. The second L2 device 640 sends the second instance of the fourth test data unit to the destination device 650.

Note both the destination device 650 and the second L2 device 640 are associated with the second VLAN 670, and the third test data unit is sent to the second L2 device 640 from the L3 device 630. Hence, the MAC address of the destination device 650 is obtained by the L3 device 630 via either a routing lookup table or via an ARP request. The destination MAC address portion (e.g., portion 402 in FIG. 4) of the third test data unit can be populated as the MAC address of the destination device 650 by the L3 device 630. In such instances, after defining the fourth test data unit (based on the third test data unit and the quality datum associated with processing the third test data unit in the second L2 device 640), the second L2 device 640 can lookup an entry in its MAC address table for a port that corresponds to the port (with the same VLAN ID of the port that received the third test data unit/frame) where the MAC address of the destination device 650 was obtained (i.e., the MAC address table would have been populated when the ARP reply in response to the ARP request sent by the L3 device 630 would pass through the second L2 device 640). If the destination device 650 MAC address is found to be a broadcast or multicast address, the second L2 device 640 can flood the fourth test data unit to all the ports with the same VLAN ID (except the port that received the third test data unit/frame). If the destination device 650 MAC address is found corresponding to another port within the second L2 device 640, the second L2 device 640 can send the fourth test data unit to the identified port for transmission to the destination device 650. If the destination device 650 MAC address is not in the MAC address table, the fourth test data unit is temporarily stored in a buffer. The second L2 device 640 can generate a new test data unit with a different session ID portion and flood the new test data unit on all the ports in the corresponding VLAN (i.e., send to all the ports with the same VLAN ID). Once the destination device 650 with the appropriate MAC address sends back a reply signal, the second L2 device 640 can use the properties (e.g., egressing CoS value) of the port in communication with the destination device 650 reply signal to update the MAC address table and identify the port in communication to the destination device 650. The second L2 device 640 can then update the fourth test data unit stored in the buffer and forward the fourth test data unit (from the buffer) to the appropriate port to transmit the fourth test data unit to the destination device 650.

Figure 7:
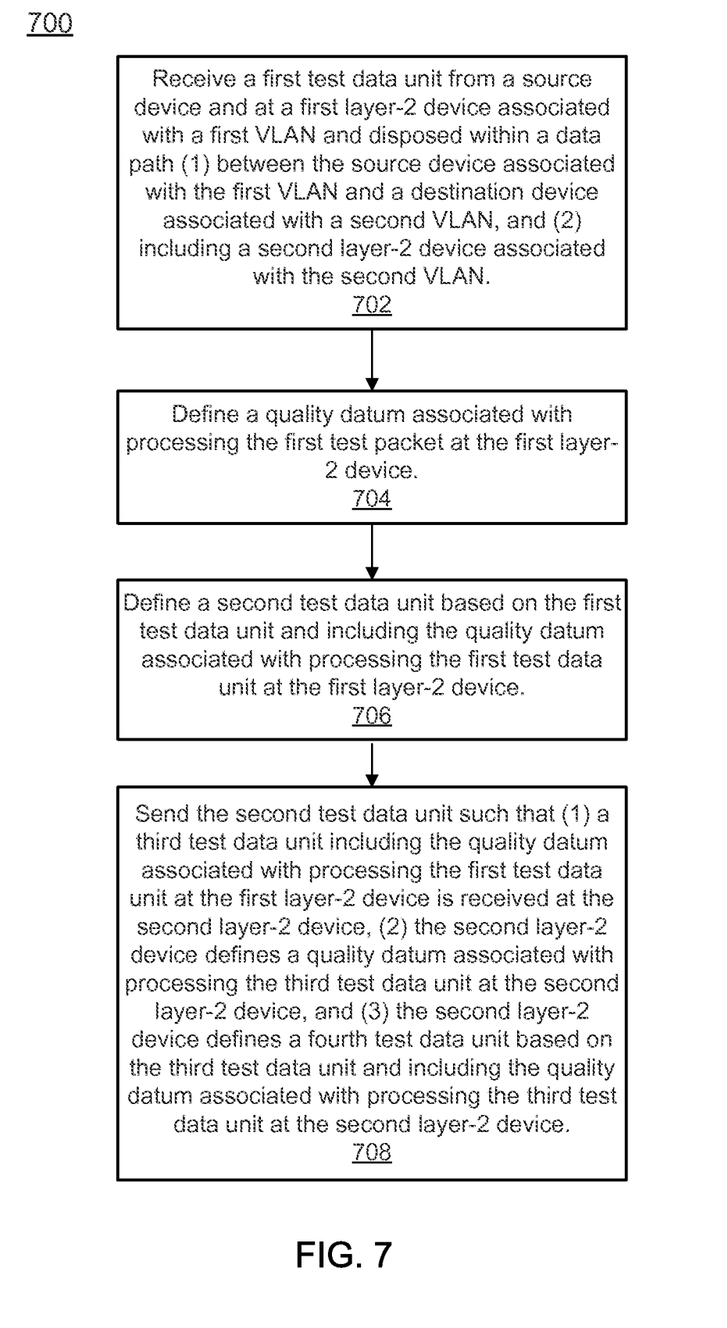
FIG. 7 is a flow chart illustrating a method for tracing the route and the delays associated with a data path between a source device and a destination device located on separate Virtual Local Area Networks (VLAN's), according to an embodiment.

FIG. 7 is a flow chart illustrating a method for tracing the route and the delays associated with a data path between a source device and a destination device located on separate Virtual Local Area Networks (VLAN's), according to an embodiment. The method 700 includes, at 702, receiving at a first L2 device, a first test data unit from a source device where the first L2 device and the source device are associated with a first VLAN. The first L2 device is also disposed within a data path between the source device associated with the first VLAN and a destination device associated with a second VLAN, and including a second L2 device associated with the second VLAN. The first test data unit is sent from the source device in the first VLAN in route to the destination device in the second VLAN to determine the exact route taken by the test data units along the data path and to generate a log or report of the latency associated with each L2 and/or L3 network nodes in the data path while processing the test data units. The information obtained by the above route and latency information can be useful in troubleshooting a variety of connectivity issues in existing and future enterprise networks.

At 704, a quality datum is defined by the first L2 device that is associated with processing the first test data unit at the first L2 device. The quality datum is an indication of the amount of time for the first L2 device to process the first test data unit and is included in the quality portion of the first test data unit as, for example, a DSCP value, a CoS value, a timestamp, a delay value, and/or a number indicating the delay in processing the first test data unit in the L2 device.

At 706, a second test data unit is defined at the first L2 device based on the first test data unit and including the second quality datum associated with processing the first test data unit at the first L2 device. As described above, the second quality datum can be included in the quality portion of the second test data unit as, for example, a DSCP value, a CoS value, a timestamp, a delay value, and/or a number indicating the delay in processing the first test data unit in the first L2 device. As described above, in some configurations, the second test data unit defined by the first L2 device can include an identifier associated with the port at the first L2 device via which the first L2 device received the first test data unit (from the source device), and an identifier associated with the first L2 device such as, for example, a MAC address, and/or the like.

At 708, the second test data unit is sent by, for example, the first L2 device to, for example, an L3 device such that (1) a third test data unit defined by the L3 device including the quality datum associated with processing the first test data unit at the first L2 device is received at the second L2 device and, (2) the second L2 device defines a quality datum associated with processing the third test data unit at the second L2 device, and (3) the second L2 device defines a fourth test data unit based on the third test data unit and including the quality datum associated with processing the third test data unit at the second L2 device. As described above, the second L2 device and the destination device are associated with the second VLAN. The second L2 device sends a first instance or copy of the fourth test data unit to the destination device and a second instance or copy of the fourth test data unit back to the source device (via the second L2 device, the L3 device and the first L2 device). As also described above, if no ports in the second L2 device can be associated with the MAC address of the destination device after a pre-determined number of queries (such as MAC address flood signals, etc.), the second L2 device can set the error ID portion bit and the direction ID portion bit of the fourth test data unit to "1" and send the fourth test data unit back to the source device.

The use of the test data units for assessing the quality of a data path between a source device and a destination device in an enterprise network as described above works efficiently with both L2 and L3 devices. The proposed technique also provides the user (e.g., a network administrator, a network engineer, etc.) with a detailed data path (or complete route trace) of all L2 and L3 devices, their corresponding egress ports (or interfaces) and the quality information (e.g., the delay occurring in processing the test data units at each intermediate L2 or L3 device, a Class of Service value—CoS, etc.) at each physical hop along the data path. This technique can significantly increase the ability of determining the actual data path that different kinds of traffic takes in an enterprise network comprised of switches (L2 devices) and routers (L3 devices), and can also provide the CoS and other quality information at each hop (or stage) that can be used to identify any loopholes in the network-wide Quality of Service (QoS) policy. Thus such a technique can help reduce connectivity problems in an enterprise network and increase predictability of network traffic, and thus can increase the efficiency of a network.

While shown and described herein as operating across a data path having both L2 devices and L3 devices, in some embodiments, a test data unit can be sent between a source and a destination device connected by only L2 devices or only L3 devices to determine quality information of each hop in the data path. Thus, such test data units can be used to determine quality information of an L2 only data path, an L3 only data path or a data path with both L2 devices and L3 devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
   a layer-3 device configured to be operatively coupled within a network, the layer-3 device configured to be disposed within a data path (1) between a source device and a destination device, and (2) including at least one layer-2 device,
   the layer-3 device configured to receive a first test data unit from the source device, the layer-3 device configured to generate a quality datum associated with processing the first test data unit at the layer-3 device, the layer-3 device configured to define a second test data unit based on the first test data unit and including the quality datum associated with processing the first test data unit at the layer-3 device,
   the layer-3 device configured to send a first instance of the second test data unit to the at least one layer-2 device such that the at least one layer-2 device generates a quality datum associated with processing the first instance of the second test data unit at the at least one layer-2 device and defines a third test data unit including the quality datum associated with processing the first instance of the second test data unit at the at least one layer-2 device,
   the layer-3 device configured to send a second instance of the second test data unit to the source device after generating the quality datum associated with processing the first test data unit at the layer-3 device.

2. The apparatus of claim 1, wherein the quality datum associated with processing the first test data unit at the layer-3 device is associated with an amount of time to process the first test data unit at the layer-3 device.

3. The apparatus of claim 1, wherein the layer-3 device is configured to send the first instance of the second test data unit to the at least one layer-2 device based on an address of the destination device within the first test data unit.

4. The apparatus of claim 1, wherein the layer-3 device is configured to be operably coupled to the source device associated with a first Virtual Local Area Network (VLAN) and the destination device associated with a second VLAN different from the first VLAN.

5. The apparatus of claim 1, wherein the quality datum associated with processing the first test data unit is at least one of a Differentiated Services Code Point (DSCP) value or a Class of Service (CoS) value.

6. The apparatus of claim 1, wherein the first instance of the second test data unit includes (1) an identifier associated with a port at the layer-3 device via which the layer-3 device received the first test data unit, and (2) an identifier associated with the layer-3 device.

7. A method, comprising:
   receiving, at a layer-3 device and from a layer-2 device operably disposed between the layer-3 device and a source device, a first test data unit;
   defining a quality datum associated with an amount of time to process the first test data unit at the layer-3 device;
   defining a second test data unit based on the first test data unit and including the quality datum associated with the amount of time to process the first test data unit at the layer-3 device; and
   sending the second test data unit to the layer-2 device such that the layer-2 device sends the second test data unit to the source device.

8. The method of claim 7, wherein the first test data unit includes a quality datum associated with processing the first test data unit at the layer-2 device.

9. The method of claim 7, wherein the second test data unit is a first instance of the second test data unit, the method further comprising:
   sending a second instance of the second test data unit to a destination device after the defining the quality datum.

10. The method of claim 7, wherein the layer-3 device is configured to be operably disposed between the layer-2 device associated with a first Virtual Local Area Network (VLAN) and a destination device associated with a second VLAN different from the first VLAN.

11. The method of claim 7, wherein the quality datum associated with the amount of time to process the first test data unit at the layer-3 device is at least one of a Differentiated Services Code Point (DSCP) value or a Class of Service (CoS) value.

12. An apparatus, comprising:
    a first layer-2 device configured to be operatively coupled within a network, the first layer-2 device associated with a first Virtual Local Area Network (VLAN), the first layer-2 device configured to be disposed within a data path (1) between a source device and a destination device, and (2) including a second layer-2 device, the second layer-2 device associated with a second VLAN different from the first VLAN,
    the first layer-2 device configured to receive a first test data unit from the source device, the first layer-2 device configured to generate a quality datum associated with an amount of time to process the first test data unit at the first layer-2 device, the first layer-2 device configured to define a second test data unit based on the first test data unit and including the quality datum associated with the amount of time to process the first test data unit at the first layer-2 device,
    the first layer-2 device configured to send the second test data unit such that the second layer-2 device receives a third test data unit, generates a quality datum associated with processing the third test data unit at the second layer-2 device and defines a fourth test data unit including the quality datum associated with processing the third test data unit at the second layer-2 device.

13. The apparatus of claim 12, wherein the first layer-2 device is configured to send the second test data unit to a layer-3 device such that (1) the layer-3 device defines a quality datum associated with processing the second test data unit at the layer-3 device, and (2) the layer-3 device defines the third test data unit based on the second test data unit and including the quality datum associated with processing the second test data unit at the layer-3 device.

14. The apparatus of claim 12, wherein the first layer-2 device is configured to send the second test data unit based on an address of the destination device within the first test data unit.

15. The apparatus of claim 12, wherein the second test data unit is a first instance of the second test data unit, the first layer-2 device configured to send a second instance of the second test data unit based on an address of the source device and after generating the quality datum associated with the amount of time to process the first test data unit at the first layer-2 device.

16. The apparatus of claim 12, wherein the quality datum associated with the amount of time to process the first test data unit at the first layer-2 device is at least one of a Differentiated Services Code Point (DSCP) value or a Class of Service (CoS) value.

17. The apparatus of claim 12, wherein the second test data unit includes (1) an identifier associated with a port at the first layer-2 device via which the first layer-2 device received the first test data unit, and (2) an identifier associated with the first layer-2 device.

18. An apparatus, comprising:
a first layer-2 device configured to be operatively coupled within a network, the first layer-2 device associated with a first Virtual Local Area Network (VLAN), the first layer-2 device configured to be disposed within a data path (1) between a source device and a destination device, and (2) including a second layer-2 device, the second layer-2 device associated with a second VLAN different from the first VLAN,
the first layer-2 device configured to receive a first test data unit from the source device, the first layer-2 device configured to generate a quality datum associated with processing the first test data unit at the first layer-2 device, the first layer-2 device configured to define a second test data unit based on the first test data unit and including the quality datum associated with processing the first test data unit at the first layer-2 device,
the first layer-2 device configured to send a first instance of the second test data unit such that the second layer-2 device receives a third test data unit, generates a quality datum associated with processing the third test data unit at the second layer-2 device and defines a fourth test data unit including the quality datum associated with processing the third test data unit at the second layer-2 device,
the first layer-2 device configured to send a second instance of the second test data unit based on an address of the source device and after generating the quality datum associated with processing the first test data unit at the first layer-2 device.

19. The apparatus of claim 18, wherein the first layer-2 device is configured to send the first instance of the second test data unit to a layer-3 device such that (1) the layer-3 device defines a quality datum associated with processing the first instance of the second test data unit at the layer-3 device, and (2) the layer-3 device defines the third test data unit based on the first instance of the second test data unit and including the quality datum associated with processing the first instance of the second test data unit at the layer-3 device.

20. The apparatus of claim 18, wherein the first layer-2 device is configured to send the first instance of the second test data unit based on an address of the destination device within the first test data unit.

21. The apparatus of claim 18, wherein the quality datum associated with processing the first test data unit at the first layer-2 device is at least one of a Differentiated Services Code Point (DSCP) value or a Class of Service (CoS) value.

22. The apparatus of claim 18, wherein the second test data unit includes (1) an identifier associated with a port at the first layer-2 device via which the first layer-2 device received the first test data unit, and (2) an identifier associated with the first layer-2 device.

* * * * *